United States Patent [19]

Prochazka et al.

[11] 4,119,690

[45] Oct. 10, 1978

[54] SINTERING OF SILICON NITRIDE USING MG AND BE ADDITIVES

[75] Inventors: Svante Prochazka, Ballston Lake; Charles D. Greskovich, Schenectady; Richard J. Charles, Schenectady; Robert A. Giddings, Schenectady, all of N.Y.

[73] Assignee: General Electric Company, Schenectady, N.Y.

[21] Appl. No.: 756,086

[22] Filed: Jan. 3, 1977

[51] Int. Cl.² .................... C04B 35/58; C04B 35/64
[52] U.S. Cl. ............................. 264/65; 106/73.5; 106/55
[58] Field of Search ............... 264/65; 106/73.5, 55; 423/344

[56] References Cited

U.S. PATENT DOCUMENTS

| | | | |
|---|---|---|---|
| 3,953,221 | 4/1976 | Lange | 106/73.5 |
| 3,999,497 | 11/1976 | Terwilliger et al. | 264/66 |
| 4,017,319 | 4/1977 | Greskovich et al. | 264/65 |

FOREIGN PATENT DOCUMENTS 970,639  9/1964  United Kingdom ............ 423/344

OTHER PUBLICATIONS

Mitomo; M., "Pressure Sintering of $Si_3N_4$", Journal of Materials Science, 11(1976), 1103–1107.

*Primary Examiner*—Winston A. Douglas
*Assistant Examiner*—Mark Bell
*Attorney, Agent, or Firm*—Jane M. Binkowski; Joseph T. Cohen; Charles T. Watts

[57] ABSTRACT

A particulate dispersion of silicon nitride, magnesium additive and beryllium additive is formed into a green body and sintered at a temperature ranging from about 1800° C to about 2200° C in a sintering atmosphere of nitrogen at superatmospheric pressure producing a sintered body with a density ranging from about 80 to about 100%.

8 Claims, 1 Drawing Figure

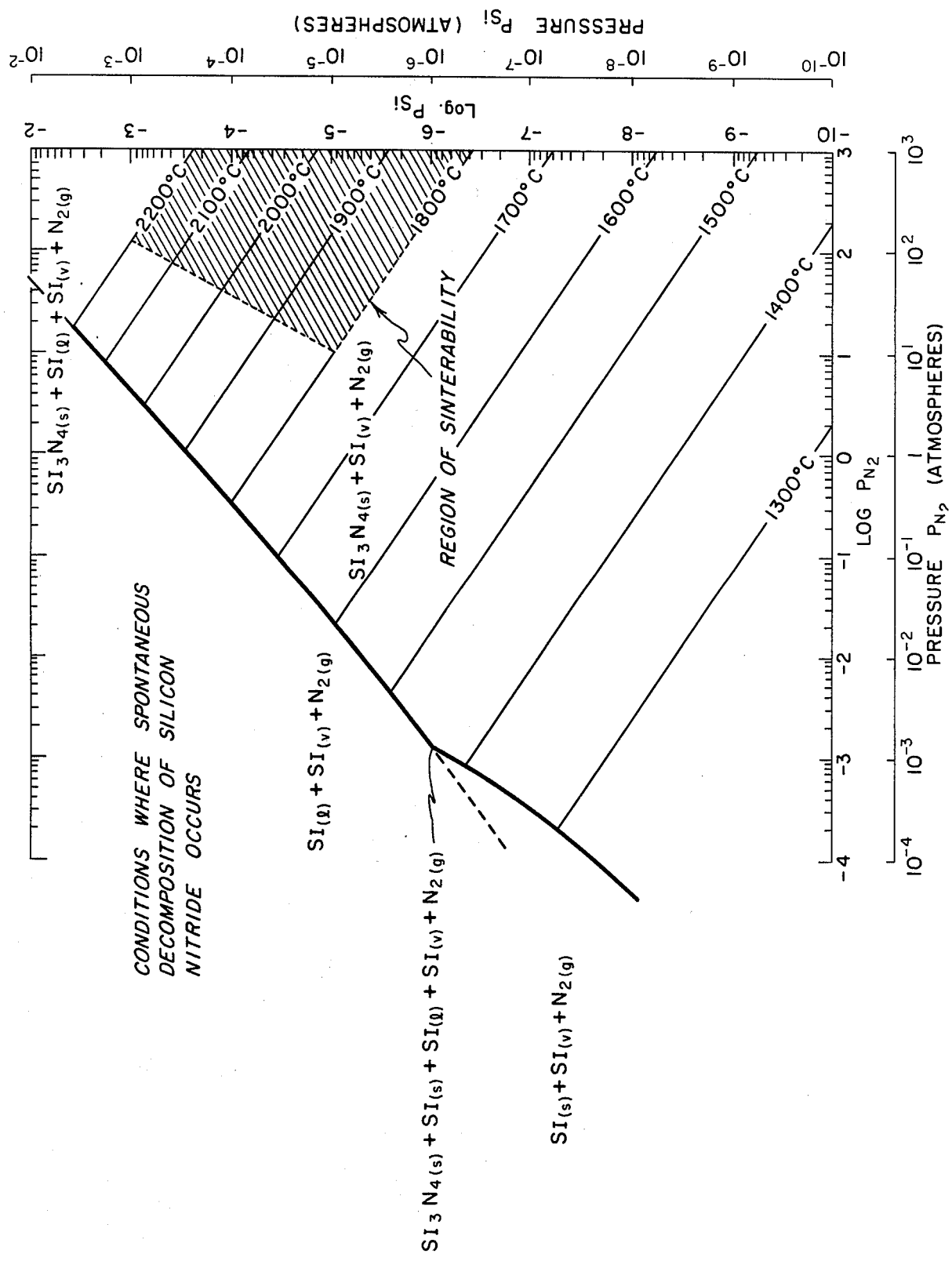

SINTERING OF SILICON NITRIDE USING MG AND BE ADDITIVES

The invention herein described was made in the course of or under a contract or subcontract thereunder (or grant) with the Department of the Air Force.

The present invention relates to a method of producing a pre-shaped polycrystalline silicon nitride sintered body having a density of at least about 80%.

Silicon nitride, the stoichiometric formulation for which is $Si_3N_4$, is a refractory electrical insulator with high strength, hardness, high resistance to thermal shock and consequently, has many potential high temperature applications. The characteristics which make it unique among other materials is the low thermal expansion coefficient combined with its refractoriness and oxidation stability. Silicon nitride has long been a prime candidate material in the development of components for high temperature heat engines.

Silicon nitride parts are currently manufactured by either reaction bonding of silicon or hot-pressing. The first process has inherent limitations in achievable densities, and therefore strength, which exclude it from a number of typical applications. Consolidation by hot-pressing is achieved by using additions of oxides or nitrides of Mg, Be, Ca, Y, La, Ce, Zr to $Si_3N_4$. The resulting ceramic is very strong but machining of complex components is very lengthy, difficult and frequently impossible or prohibitively expensive.

Sintering which would overcome the shaping problems has also been tried but with limited success since at temperatures approaching 1750° C. at atmospheric pressure silicon nitride decomposes rapidly. Silicon nitride with 90% density has been obtained by using an addition of 5% magnesia, by G. R. Terwilliger and F. F. Lange, "Pressureless Sintering of $Si_3N_4$", Journal of Materials Science 10(1975)1169, however, weight losses of up to 30% were observed and made the process impractical.

M. Mitomo, "Pressure Sintering of $Si_3N_4$", Journal of Materials Science 11(1976)1103–1107, discloses the sintering of $Si_3N_4$ with 5% MgO at 1450° to 1900° C. under a pressure of 10 atmospheres of nitrogen producing a maximum density of 95% of the theoretical value, that density and weight loss initially increased at the higher temperatures, that the density then decreased above a certain temperature because it was determined by two countervailing processes, shrinkage and thermal decomposition of silicon nitride and that his optimum temperature was ~ 1800° C.

It is known in the art that the high magnesium oxide additive necessary to induce sintering degrades oxidation resistance and high temperature mechanical properties of the silicon nitride product. The present invention does not use an oxide additive. Specifically, in contrast to sintering processes which use metal oxide additives such as magnesium oxide, which do not decompose readily and which therefore retain substantially all of the oxygen introduced by the metal additive, in the present sintering process oxygen is always lost from the sintering body in a significant amount. Also, in the present process, the sintering body undergoes no significant weight loss due to the thermal decomposition of the silicon nitride and this is indicated by the high densities of the resulting sintered product which can range from 80 to 100% of the theoretical density of silicon nitride. In addition, the present invention makes it possible to fabricate complex shaped articles of silicon nitride directly with little or no machining.

Those skilled in the art will gain a further and better understanding of the present invention from the detailed description set forth below, considered in conjunction with the FIGURE accompanying and forming a part of the specification which shows conditions where spontaneous decomposition of silicon nitride occurs, i.e. to the left to the heavy solid line, conditions where spontaneous decomposition of silicon nitride does not occur, i.e. to the right of the heavy solid line, and conditions necessary for producing the present sintered product, i.e. the shaded area referred to as the Region of Sinterability. Specifically, silicon nitride decomposes into silicon and nitrogen, and consequently, there is always a finite pressure of silicon vapor and nitrogen above a surface of silicon nitride. According to principles of chemical equilibrium, the higher the nitrogen pressure the lower the silicon vapor pressure and vice versa. The conditions shown to the right of the heavy solid line in the FIGURE are plots at a given temperature of the logarithm of the partial pressure of nitrogen and the logarithm of the corresponding partial pressure of silicon vapor. For convenience, a scale in atmospheres for the partial pressure of nitrogen as well as for the partial pressure of silicon vapor are given. At any conditions selected to the right of the heavy solid line in the FIGURE, spontaneous thermal decomposition of silicon nitride does not occur, but only the shaded area referred to as the Region of Sinterability sets forth temperature and corresponding pressure conditions which produce the present sintered product.

Briefly stated, the present process comprises forming a homogeneous dispersion having an average particle size which is submicron of silicon nitride and Be and Mg additives, shaping the dispersion into a green body, and sintering the green body at a temperature ranging from about 1800° C. to about 2200° C. in a sintering atmosphere of nitrogen at a superatmospheric pressure of nitrogen which at the sintering temperature is sufficient to prevent significant thermal decomposition of the silicon nitride and which produces a sintered body with a density of at least about 80% of the theoretical density of silicon nitride.

By a significant thermal decomposition of silicon nitride herein it is meant significant weight loss of silicon nitride due to thermal decomposition of silicon nitride and such significant weight loss of silicon nitride would be higher than about 3% by weight of the total amount of silicon nitride in the green body. Usually, however, in the present invention, weight loss of silicon nitride due to thermal decomposition of silicon nitride is less than 1% by weight of the total amount of silicon nitride in the green body.

The silicon nitride powder used in the present process can be amorphous or crystalline or mixtures thereof. The crystalline silicon nitride powder can be α- or β-silicon nitride or mixtures thereof.

The present starting silicon nitride powder can range in purity from a totally pure silicon nitride powder to one of ceramic grade. The necessary purity of the silicon nitride powder used depends largely on the temperatures and loads at which the final sintered product will be used with the highest temperatures of use generally requiring the most pure powders. Specifically, with increasingly pure powder the resulting sintered product increasingly retains its room temperature properties at high temperatures, i.e. the more stable are the properties of the sintered product with increasing temperature.

The present silicon nitride powder may contain metallic and non-metallic impurities. Specifically, based on the total composition of the starting silicon nitride powder, its oxygen content may range up to about 5% by weight. A powder having an oxygen content in excess of about 5% by weight provides no advantage because it is likely to produce a sintered product with impaired high temperature mechanical properties. Normally the oxygen is present in the form of silica. The amount of excess elemental silicon which may be present in the powder is not critical, providing it is of submicron size, since during the sintering process elemental silicon is nitrided to form silicon nitride, and providing that the volume increase accompanying nitridation of the elemental silicon has no significant deleterious effect on the sintered product. Ordinarily, elemental silicon may be present in silicon nitride powder in amounts ranging up to about 4% by weight. Non-metallic impurities such as halogens which evaporate during sintering and which do not significantly deteriorate the properties of the sintered silicon nitride body may also be present, frequently in amounts up to about 3% by weight of the starting silicon nitride powder.

Ceramic grade silicon nitride powder normally contains metallic impurities such as calcium, iron, and aluminum which tend to form in the sintered product intergranular low melting phases that have a significantly deleterious effect on the product's properties at elevated temperatures. In the present process, when ceramic grade silicon nitride powder is used, the total amount of such metallic impurities should not be higher than that typically found in such powders which is about 1% by weight of the starting powder. Specifically, when such metallic impurities are present in an amount of about 1% by weight, the resulting sintered product is usually dark grey in color and it is useful for applications at temperatures not higher than about 1300° C. and not requiring high load bearing capacity. With decreasing amounts of these metallic impurities, the mechanical properties of the resulting sintered product at elevated temperatures improve, particularly with elimination of calcium and iron.

To produce a sintered product which has significantly stable mechanical properties at high temperatures, the preferred starting silicon nitride powder has a low oxygen content, i.e. less than about 2% by weight of the powder, and it is free or substantially free of metallic impurities which form intergranular low melting phases. Specifically, this preferred silicon nitride powder may contain metallic impurities such as calcium, iron and aluminum in total amount ranging up to about 0.1% by weight, preferably no higher than about 0.05% by weight of the starting silicon nitride powder, and the resulting sintered product is light tan, light grey or white in color. However, the most preferred silicon nitride powder of the present process for producing a sintered product with substantially stable, i.e., most stable, mechanical properties at high temperatures is also oxygen free or may contain oxygen in an amount ranging up to about 1% by weight of the powder. Such a pure silicon nitride powder can be synthesized. Alternatively, to reduce its oxygen content and also remove its vaporizable impurities, the silicon nitride powder can be calcined at a temperature ranging from about 1400° C. to about 1500° C. in a vacuum or in an atmosphere which has no significant deteriorating affect on the powder such as helium, nitrogen, hydrogen and mixtures thereof.

Specifically, the preferred silicon nitride powders can produce in accordance with the present process a sintered product which retains its room temperature shape and mechanical properties at high temperatures making it particularly useful for high temperature structural applications such as gas turbine blades, i.e. they can produce a sintered product which undergoes no significant change in density or mechanical properties after substantial exposure to air at temperatures ranging up to about 1400° C. and after substantial exposure in an atmosphere in which it is substantially inert such as argon to temperatures above 1500° C. ranging up to about 1700° C.

The present preferred silicon nitride powder can be produced by a number of processes. For example, in one process $SiO_2$ is reduced with carbon in nitrogen below 1400° C. Still other processes react a silicon halide with ammonia or a nitrogen and hydrogen mixture to obtain either $Si_3N_4$ directly or via precursors such as $Si(NH)_2$ which are converted to $Si_3N_4$ by calcination yielding silicon nitride which usually contains oxygen and halogens at a 1 to 3% by weight level. The powder can also be synthesized in a plasma from silicon vapor and nitrogen.

Very pure silicon nitride powder can be formed by a process set forth in Ser. No. 756,241 filed of even date herewith in the names of Svante Prochazka and Charles D. Greskovich and assigned to the assignee hereof and which by reference is incorporated herein. Specifically, this copending application discloses reacting silane and an excess amount of ammonia above 600° C. and calcining the resulting solid at between 1100° C. to 1500° C. to obtain amorphous or crystalline silicon nitride.

In the present process the magnesium additive is selected from the group consisting of elemental magnesium, magnesium carbide, magnesium nitride, magnesium cyanide, magnesium fluoride, magnesium silicide, magnesium silicon nitride and mixtures thereof. The known stoichiometric formulations for these additives are $Mg$, $Mg_2C$, $Mg_3N_2$, $Mg(CN)_2$, $MgF_2$, $Mg_2Si$, and $MgSiN_2$, respectively. The magnesium additive is used in an amount so that its magnesium component is equivalent to from about 0.5 to about 4.0% by weight of elemental magnesium, and preferably from about 1.0 to about 2.0% by weight of elemental magnesium, based on the amount of silicon nitride. Amounts of the magnesium additive less than that equivalent to about 0.5% by weight of elemental magnesium are not effective in producing the present sintered body with a density of at least about 80%, while amounts of the magnesium additive larger than that equivalent to about 4% by weight of elemental magnesium signficantly deteriorate the sintered product's resistance to oxidation at temperatures above 1200° C.

In the present process the beryllium additive is selected from the group consisting of elemental beryllium, beryllium carbide, beryllium nitride, beryllium fluoride, beryllium silicon nitride and mixtures thereof. The known stoichiometric formulations for these additives are $Be$, $Be_2C$, $Be_3N_2$, $BeF_2$, and $BeSiN_2$, $Be_6Si_3N_8$, $Be_4SiN_4$, $Be_5Si_2N_6$, $Be_{11}Si_5N_{14}$, $Be_9Si_3N_{10}$. In the present process the beryllium additive is used in an amount so that its beryllium component is equivalent to from about 0.1 to about 2.0% by weight of elemental beryllium, and preferably from about 0.5 to about 1.0% by weight of elemental beryllium, based on the amount of silicon nitride. Amounts of the beryllium additive outside the range are not effective in producing the present sintered body with a density of at least about 80%.

In the present process, the particular ratio of magnesium additive/beryllium additive used, i.e. the particular ratio of elemental magnesium to elemental beryllium, is determinable empirically and depends largely on the particular silicon nitride powder used, sintering temperature, nitrogen pressure during sintering and the properties desired in the final product. Preferably, the magnesium component of the additive is equivalent to an amount of elemental magnesium which is substantially the same or larger than the amount of elemental beryllium to which the beryllium component is equivalent. The particularly preferred ratio of the magnesium and beryllium components is equivalent to the range of about one part by weight to three parts by weight of elemental magnesium for about each part by weight of elemental beryllium.

In carrying out the present process at least a significantly or substantially homogeneous particulate dispersion having an average particle size which is submicron of silicon nitride, magnesium additive and beryllium additive is formed. Such a dispersion is necessary to produce a sintered product with significantly uniform properties and having a density of at least 80%. The silicon nitride, magnesium and beryllium additive powders, themselves, may be of particle size which breaks down to the desired size in forming the dispersion, but preferably the starting silicon nitride is submicron and the starting additives are less than 5 microns in particle size, and preferably submicron. Generally, the silicon nitride powder ranges in mean surface area from 2 square meters per gram to about 50 square meters per gram which is equivalent to about 0.94 micron to 0.04 micron, respectively. Preferably, the silicon nitride powder ranges in mean surface area from about 5 square meters per gram to about 25 square meters per gram which is equivalent to about 0.38 micron to about 0.08 micron, respectively.

The silicon nitride, magnesium additive and beryllium additive powders can be admixed by a number of techniques such as, for example, ball milling or jet milling, to produce a significantly or substantially uniform or homogeneous dispersion or mixture. The more uniform the dispersion, the more uniform is the microstructure, and therefore, the properties of the resulting sintered body.

Representative of these mixing techniques is ball milling, preferably with balls of a material such as tungsten carbide or silicon nitride which has low wear and which has no significant detrimental effect on the properties desired in the final product. If desired, such milling can also be used to reduce particle size, and to distribute any impurities, which may be present, substantially uniformly throughout the powder. Preferably, milling is carried out in a liquid mixing medium which is inert to the ingredients. Typical liquid mixing mediums include hydrocarbons such as benzene and chlorinated hydrocarbons. Milling time varies widely and depends largely on the amount and particle size of the powder and type of milling equipment. In general, milling time ranges from about 1 hour to about 100 hours. The resulting wet milled material can be dried by a number of conventional techniques to remove the liquid medium. Preferably, it is dried in a vacuum oven maintained just above the boiling point of the liquid mixing medium.

A number of techniques can be used to shape the powder mixture, i.e., particulate dispersion, into a green body. For example, the powder mixture can be extruded, injection molded, die-pressed, isostatically pressed or slip cast to produce the green body of desired shape. Any lubricants, binders or similar materials used in shaping the dispersion should have no significant deteriorating effect on the green body or the resulting sintered body. Such materials are preferably of the type which evaporate on heating at relatively low temperatures, preferably below 200° C., leaving no significant residue. The green body, should have a density of at least about 35%, and preferably at least about 45% or higher, to promote densification during sintering and achieve attainment of the desired density of at least 80% or higher.

In the present process, the sintering atmosphere of nitrogen can be stagnant, but preferably it is a flowing atmosphere and need only be sufficiently flowing to remove gaseous products which may be present, normally as a result of contaminants. Generally, the specific flow rate of nitrogen gas depends on the size of the furnace loading and somewhat on sintering temperature. The nitrogen gas used should be free of oxygen or substantially free of oxygen so that there is no significant oxygen pickup by the sintering body.

Sintering of the green body is carried out at a temperature ranging from about 1800° C. to about 2200° C. in a sintering atmosphere of nitrogen at superatmospheric pressure which at the sintering temperature prevents thermal decomposition of the silicon nitride and also promotes shrinkage, i.e. densification, of the green body producing a sintered body with a density of at least 80% of the theoretical density of silicon nitride. Sintering temperatures lower than about 1800° C. are not effective for producing the present sintered product whereas temperatures higher than 2200° C. would require nitrogen pressures too high to be practical. Preferably, the sintering temperature ranges from about 1950° C. to 2100° C.

The effect of increased nitrogen pressure on the sintering of silicon nitride can be best described by considering the effect of nitrogen pressure on the thermal decomposition

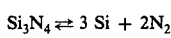

i.e. silicon nitride decomposes into silicon and nitrogen, and consequently there is always a finite pressure of silicon vapor and nitrogen above a surface of silicon nitride. According to principles of chemical equilibrium, the higher the nitrogen pressure the lower the silicon vapor pressure and vice versa. This may be expressed in quantitative terms by

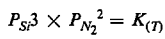

where $P_{Si}$ is partial pressure of silicon vapor, $P_{N2}$ partial pressure of nitrogen and $K$ is the equilibrium constant which is calculated from available published thermodynamical data and refers to a specific temperature. Specifically, the published thermodynamical data relied on herein is disclosed in Still et al., JANAF Thermochemical Tables, 2nd Ed., U.S. Dept. of Commerce, Nat.-Stand.Ref. Data Ser.-Nat.Bur.Stand. (U.S.), 37, U.S. Government Printing Office, Washington, (June 1971). These thermodyamic relationships were calculated and are shown in the accompanying figure where the logarithm of partial pressure of silicon vapor and partial pressure of nitrogen were plotted along with temperature scales and the coexisting phases shown.

From the FIGURE it can be seen that if nitrogen pressure above $Si_3N_4$ decreases at a given temperature, silicon vapor pressure increases until the saturated pressure of silicon vapor at the temperature applied is reached. At this and at lower nitrogen pressures silicon nitride will spontaneously decompose into silicon metal (liquid or solid) and nitrogen. In the FIGURE, the heavy solid line, from lower left to upper right delineates the set of conditions where silicon nitride, condensed silicon, silicon vapor and nitrogen gas coexist, i.e, conditions where spontaneous decomposition of silicon nitride occurs. Specifically, at any conditions selected to the left of the heavy solid line determined by nitrogen pressure and temperature, spontaneous decomposition of $Si_3N_4$ excludes sintering. At any conditions selected to the right of the heavy solid line, spontaneous thermal decomposition of silicon nitride does not occur. However, according to the present invention, only the shaded area in the FIGURE referred to as the Region of Sinterability sets forth temperature and corresponding pressure conditions which prevent thermal decomposition or significant thermal decomposition of the silicon nitride and also produce the present sintered product having a density of at least 80%. Specifically, the FIGURE illustrates that at every sintering temperature in the Region of Sinterability, a particular minimum pressure of nitrogen has to be applied and maintained which is substantially higher than the minimum pressure of nitrogen necessary to prevent spontaneous silicon nitride decomposition. The minimum sintering pressure of nitrogen is one which at a particular sintering temperature prevents thermal decomposition or significant thermal decomposition of the silicon nitride and also promotes densification, i.e. shrinkage, of the body to produce a sintered product with a density of at least 80%.

Generally, at a given sintering temperature in the Region of Sinterability, an increase in nitrogen pressure will show an increase in the density of the sintered product, i.e., higher nitrogen pressures should produce higher density products. Likewise, at a given nitrogen pressure in the Region of Sinterability, the higher the sintering temperature, the higher should be the density of the resulting sintered product.

The shaded area referred to as the Region of Sinterability in the accompanying FIGURE shows that the particular minimum pressure of nitrogen used in the present process depends on sintering temperature and ranges from about 10 atmospheres at 1800° C. to about 130 atmospheres at a temperature of 2200° C. Specifically, the FIGURE shows that in accordance with the present process the minimum required pressure of nitrogen at 1900° C. is about 20 atmospheres, at 2000° C. it is about 40 atmospheres, and at 2100° C. it is about 75 atmospheres. In the present process pressures of nitrogen higher than the required minimum pressure at a particular sintering temperature are useful to additionally densify the body to produce a sintered body having a density higher than 80%. The preferred maximum pressure of nitrogen is one which produces a sintered body of the highest density at the particular sintering temperature and such preferred maximum nitrogen pressure is determinable empirically. Nitrogen pressures higher than the preferred maximum pressure are useful but such pressures cause no significant additional densification of the body.

The present sintered product is comprised of silicon nitride and some form of magnesium and beryllium. It may also contain oxygen in some form in an amount less than about 5% by weight of the sintered product since during sintering some oxygen is always lost. Preferably, for high temperature applications, the sintered product contains oxygen in an amount less than about 2% by weight of the sintered product and/or magnesium in an amount less than about 2% by weight of the silicon nitride. For best results, and in its preferred form, the present sintered product is substantially free of oxygen or may contain oxygen in some form in an amount less than about 1% by weight of the sintered product.

The silicon nitride in the present product ranges from the $\beta$-form to a mixture of the $\beta$- and $\alpha$-forms wherein the $\beta$-form of silicon nitride is present in an amount of at least about 80% by weight of the total amount of silicon nitride. Preferably, the present product is comprised of only the $\beta$-form of silicon nitride since it provides the most stable properties.

Since during sintering a portion of the magnesium component of the magnesium additive evaporates, the sintered product contains magnesium in some form in an amount which is always significantly less than about 4.0% by weight of the silicon nitride. The amount of the magnesium component which evaporates depends largely on the properties of the particular magnesium compound formed during sintering, for example $Mg_2SiO_4$ is less vaporizable than magnesium silicon nitride, and on sintering temperature and pressure, i.e. the higher the temperature and the lower the pressure the more magnesium is likely to evaporate. Specifically, the present product will contain magnesium in some form in an amount ranging from less than about 0.5% by weight to less than about 4% by weight of the silicon nitride. Some beryllium also is lost during sintering, usually in a significant amount. The extent of beryllium evaporation depends largely on sintering temperature and pressure, i.e. the higher the temperature and the lower the pressure the more beryllium is likely to evaporate, and the sintered product contains beryllium in an amount ranging from less than about 0.1% by weight to less than about 2.0% by weight of the silicon nitride. The beryllium and magnesium components of the sintered product are detectable or determinable by techniques such as X-ray flourescent analysis, emission spectroscopy and chemical analysis. Specifically, the minimum amount of beryllium and magnesium present in the present sintered product is that amount detectable by emission spectroscopy.

The sintered body or product of the present invention has a density ranging from about 80 to about 100% of the theoretical density of silicon nitride. With reference to the sintered product or body of the present invention by the term single phase or primary phase it is meant herein the silicon nitride phase, i.e. the $\alpha$-form or $\beta$-form of silicon nitride and mixtures thereof. X-ray diffraction analysis of the sintered product shows that with lower amounts of the magnesium and beryllium additives, it is a single phase material, but that with higher amounts of the magnesium and beryllium additives, traces of a secondary phase or phases may be detectable. Generally, when the magnesium additive is used in amounts wherein its magnesium component is equivalent to levels up to about 1% by weight of elemental magnesium, and when the beryllium additive is used in amounts wherein its beryllium component is equivalent to levels up to about 1% by weight of elemental beryllium, the sintered product is usually a single phase material. However, when the magnesium additive is used in amounts wherein its magnesium component is equivalent to levels approaching or at about 2% by weight of elemental magnesium or higher, a magnesium-containing secondary phase may be detected in the resulting sintered product. Also, when the beryllium additive is used in amounts wherein its beryllium component is equivalent to levels approaching or at about 2% by weight of elemental beryllium, a secondary beryllium-containing phase may be detected in the resulting sintered product.

The secondary phase or phases are discrete and distributed significantly or substantially uniformly throughout the sintered body. Generally, the grains of the secondary phase or phases are of about the same size or finer than the grains of the primary phase.

When a preferred silicon nitride powder is used, i.e. a non-ceramic grade powder, i.e. a powder not prepared by nitridation of silicon, containing oxygen in an amount less than about 2% by weight of the starting powder, usually the secondary phase is beryllium silicon nitride, magnesium silicon nitride and mixtures or solid solutions thereof. Forsterite, $Mg_2SiO_4$, is likely to form as a secondary phase when the starting silicon nitride powder contains oxygen in some form in relatively high amount, i.e. usually in amounts higher than about 2% by weight. Depending on the particular amount of beryllium, magnesium, and oxygen present, the secondary phase or phases detectable in the resulting sintered product may range in total amount from a trace amount which is just detectable by X-ray diffraction analysis, i.e. about 2% by volume of the sintered body, up to about 10% by volume of the sintered body.

When a ceramic grade silicon nitride powder is used, the metallic impurities therein may also form a secondary phase in the sintered product. For example, such a powder may contain metallic impurities such as calcium, iron and aluminum in total amount no higher than about 1% by weight, and oxygen in some form ranging up to about 5% by weight of the starting silicon nitride powder. The amount of secondary phase or phases formed in the sintered product in this instance depends largely on the amounts of metallic impurities and oxygen, as well as the amounts of beryllium and magnesium present. Specifically, the secondary phase or phases may range up to about 15% by volume of the sintered body, but it may or may not be detected by X-ray diffraction analysis depending on the particular secondary phase formed. Due to the particular impurities present in ceramic grade powder, the secondary phase may be a glassy phase and not detectable by X-ray diffraction analysis. The extent and distribution of glassy phase present is very difficult to determine, and it is usually done by selective etching of the specimen and observing the pits formed by the etched out glassy phase. However, it is estimated that from the maximum amounts of metallic impurities, oxygen and additives which may be present herein, the secondary phase or phases produced may range, in total amount, up to about 15% by volume of the sintered body.

Also, in the present sintering process a significant amount of oxygen is lost, usually in the form of silicon monoxide. Therefore, the maximum amount of oxygen which can be present in the present sintered product is significantly less than 5% by weight of the product.

The present sintered product has a microstructure which is largely temperature dependent. The microstructure may range from an equiaxed type composed of uniform, fine-sized equiaxed or substantially equiaxed grains which may be of the $\beta$-form or a mixture of the $\beta$- and $\alpha$-forms of silicon nitride, to an elongated type which is composed of nonuniform, elongated, needle-like, grains of the $\beta$-form of silicon nitride. This range in microstructure includes microstructures of all ratios or combinations of the equiaxed and elongated types.

The lower sintering temperature range of 1800° C. up to about 1900° C., produces a product with a fine-grained microstructure with uniform or substantially uniform grains which normally range from equiaxed to only slightly elongated and usually are less than about 2 microns in size. However, at a sintering temperature of about 200° C., elongated needle-like grains of the $\beta$-form of silicon nitride appear in the still fine-equiaxed-grain microstructure. Specifically, a sintering temperature of about 2000° C. produces a product with a microstructure with elongated grains, typically 1 to 2 microns thick and 3 to 10 microns in length, distributed in a fine-grained matrix typically with grains 1 to 2 microns thick. At sintering temperatures higher than 2000° C., the elongated $\beta$-grains increase in number per unit volume. Usually, these elongated grains have an aspect ratio ranging from about 5 to about 10, but occasionally these elongated grains may range in length up to about 30 microns or longer. Subjecting or annealing the present product to a temperature of about 2000° C. or higher at the present required nitrogen pressure for such temperature for a sufficient period of time converts the entire or at least substantially the entire microstructure to the nonuniform, elongated $\beta$-form. Such annealing can be carried out in a matter of hours, depending on the size of the product and the particular annealing temperature used. Preferably, such annealing can be carried out by combining the sintering and annealing in a single step, but if desired, the annealing can be carried out as a separate step. The elongated, needle-like grains of the $\beta$-form of silicon nitride are desirable because they increase the fracture toughness of the product making it less brittle as long as they are not grown to a length greater than about 75 microns.

The present sintered body having a density of 90% or higher is usually one wherein most of or all of the residual pores are closed, i.e. non-interconnecting, and such a sintered body is preferred since it is impervious and highly resistant to inernal oxidation at elevated temperatures. Also, the higher the density of the sintered product, the better are its mechanical properties.

The present invention makes it possible to fabricate complex shaped polycrystalline silicon nitride ceramic articles directly. Specifically, the present sintered product may be produced in the form of a useful complex shaped article without machining such as an impervious crucible, a thin walled tube, a long rod, a spherical body, or a hollow shaped article. The dimensions of the present sintered product differ from those of its green body by the extent of shrinkage, i.e. densification, which occurs during sintering. Also, the surface quality of the sintered body depend on those of the green body from which it is formed, i.e. it has a substantially smooth surface if the green body from which it is formed has a smooth surface.

In the present invention, unless otherwise stated, the density of the sintered body as well as that of the green body is given as a fractional density of the theoretical density of silicon nitride (3.18 g/cc).

The invention is further illustrated by the following examples wherein the procedure was as follows unless otherwise stated:

In-house silicon nitride powder was prepared as disclosed in copending Ser. No. 756,241 filed of even data herewith. Specifically, this powder was prepared in a furance which included an open-ended fused silica reaction tube 3.8 cm. diameter placed in a tube furance, i.e. except for its open-end portions the reaction tube was located inside the furnace, and connected on the downstream end to a coaxial electrostatic separator operated between 5 and 15 KV and 0.2 to 0.5 mA. The outlet of the separator was terminated with a bubbler filled with an organic solvent which ensured positive pressure in the system. A liquid manometer indicated gas pressure in the reaction tube. For each run the reaction tube was heated at a length of 15 inches to a maximum temperature of 850° C., the system purged with purified argon and the reactants were then metered in. Electronic grade silane and anhydrous ammonia dried further by passing the gas through a column of calcium nitride were metered in separately by coaxial inlets into the reaction tube. The gas flow rates were adjusted to 0.2 standard cubic feet per hour (SCFPH) of $SiH_4$ and 3.5 SCFPH of $NH_3$. A voluminous, light-tan powder was collected in the downstream end of the reaction tube and in the attached electrostatic separator. After 4 hours the gas flow of reactants was discontinued and the system was left to cool off to room temperature under a flow of 0.5 SCFPH of purified argon, and the powder was then recovered from the reactor and separator. The product was a light-tan powder, amorphous to X-rays, had wide absorption bands in its I.R. spectra centered around 10.5 and 21.0 microns (characteristic for silicon-nitrogen bonding), and contained no metals above 50 ppm determined by emission spectroscopy. It had a mean surface area of about 12 square meters per gram which is equivalent to an average particle size of about 0.16 micron.

Surface area measurements were made by a low temperature nitrogen absorption technique.

Oxygen content was determined by neutron activation analysis.

Sintering was carried out in an impervious closed end silicon carbide tube, 1.2 cm. in diameter, i.e. a silicon carbide tube open at one end only.

Temperature was measured by an optical pyrometer at the closed end of the silicon carbide tube, corrected for furnace window absorption and a mirror.

At the end of each sintering run, the power was switched off and the sintered silicon nitride bodies were furnace cooled to room temperature in he nitrogen atmosphere which was slowly depressurized to atmospheric pressure.

Liquid nitrogen labeled as "High Purity Dry Nitrogen" having less than 10 parts per million oxygen content was used as the source of nitrogen gas for the furnace atmosphere, i.e. the sintering atmosphere.

The bulk density of each pressing or green body was determined from its weight and dimensions.

Density of the sintered product was determined by water displacement using Archimedes method.

Shrinkage given in the tables is linear shrinkage, $$\frac{\Delta L}{L_o} (\%),$$

and it is the difference in length between the green body and the sintered body, $\Delta L$, divided by the length of the green body $L_o$. This shrinkage is an indication of the extent of densification.

% Weight loss is the difference in weight between the green and sintered bodies divided by the weight of the green body.

EXAMPLE 1

All of the runs tabulated in Table I were made with in-house silicon nitride powder. For some runs the powder was admixed with magnesium additive powder alone, and for other runs with beryllium additive powder alone or with a combination of the magnesium and beryllium additives. The weight % of additive given in Table I is based on the amount of silicon nitride and the amount of elemental metal to which the magnesium or beryllium components are equivalent is shown in parenthesis. The procedure used in preparing each green body was substantially the same. Green bodies of substantially the same size were formed from a homogeneous mixture having an average particle size which was submicron of the silicon nitride powder and additive or additives.

Specifically, to 12 grams of in-house silicon nitride powder there was added 0.12 gram of beryllium nitride, 0.24 gram of magnesium nitride, corresponding to 0.5% by weight of elemental beryllium and 1.5% by weight of elemental magnesium, respectively, based on the silicon nitride, and 25 cc. of a 1% solution of paraffin in benzene. All the formulation was done under nitrogen dry-box conditions. The mixture was milled with ¼ inch silicon nitride grinding media at room temperature. After about 6 hours, the resulting slurry was strained and dried from the solvent again under dry-box conditions. The resulting homogeneous submicron powder mixture was pressed into green bodies, i.e. ⅜ inch × 154 inch clyinders which were stored in a dessicator above $Ca_3N_2$. One of these pressings, i.e. green bodies, was used in Run No. 1 of Table I.

The Run No. 1 pressing was placed in the silicon carbide sintering tube which was in turn placed within a carbon resistance tube furnace except for its open end which was fitted with a pressure head. The pressing was placed so that it was positioned in the hot zone, i.e. the closed end portion of the sintering tube. The sintering tube was evacuated and then brought up to 800° C. At this point the pumping was discontinued and the sintering tube was pressurized to 55 atmospheres of nitrogen. The sintering tube was then brought up to the sintering temperature of 1700° C. in about 20 minutes, and held at 1700° C. for 10 minutes. At the end of this time, it was furnace cooled to room temperature and the resulting sintered body was evaluated. The results are shown in Table I.

The procedure used in Run Nos. 2 to 16 was substantially the same as that for Run No. 1 except as indicated in Table I. Also, for Run Nos. 5 to 12 and 15 to 16 in Table I the in-house silicon nitride powder was calcined by heating it in a mullite crucible in a flowing gas mixture of 3 parts by volume nitrogen/11 parts by volume hydrogen at about 1450° C. for 30 minutes. This calcination increased the density of the powder particles as reflected in the higher green densities of the pressings made therefrom.

The silicon nitride powder used in Run Nos. 1 to 4 had an oxygen content of 1.95% by weight of the powder. In Run Nos. 5 to 12, the oxygen content of the powder was determined after it was calcined and was found to be 2.06% by weight of the calcined powder. In Run Nos. 13 to 16 the oxygen content of the starting powder, before calcination, was determined to be 3.12% by weight of the starting powder. The sintered product of Run No. 10 had an oxygen content of 1.38% by weight of the product, indicating a significant loss of oxygen during sintering, and such loss usually occurs in the form of silicon monoxide.

Run No. 12 shows that the 1% by weight beryllium nitride additive was not effective in producing a useful sintered product at comparable temperatures.

Run Nos. 13 to 16 show that the magnesium additive alone does not appear to be sufficiently effective to bring about the highly dense products.

Table I also indicates that weight loss is about constant for a certain batch of powder and therefore it relates, more likely, to the chemistry of the powder than

TABLE I

| Run No. | Additive (Wt. %) | Approx. Green Density (%) | Sintering Conditions Temperature °C | Time (Min.) | Pressure (Atmospheres) | Shrinkage % | Weight Loss % | Density g/cc | % |
|---|---|---|---|---|---|---|---|---|---|
| 1 | 1% $Be_3N_2$ (0.5% Be) 2% $Mg_3N_2$ (1.5% Mg) | 35 | 1700 | 10 | 55 | $\approx 15$ | n.d. | n.d. | |
| 2 | " | 37 | 1750 | 15 | 28.5 | 15 | n.d. | 1.95 | 62 |
| 3 | " | 37 | 1750 | 15 | 72 | 21 | n.d. | 2.4 | 75 |
| 4 | " | 37 | 1750 | 15 | 75 | 22 | n.d. | 2.6 | 82 |
| 5 | " | 45 | 1800 | 10 | 85 | 21 | 2 | 2.99 | 94 |
| 6 | " | 45 | 1850 | 15 | 75 | 25 | 12 | 2.95 | 93+ |
| 7 | " | 44 | 1880 | 30 | 78 | 26 | 11 | 3.11 | 98 |
| 8 | " | 46 | 1850 | 20 | 85 | 19.5 | 6 | n.d. | |
| 9 | " | 46 | 1950 | 20 | 85 | 19.5 | 6 | n.d. | |
| 10 | " | 51 | 1880 | 20 | 85 | 19.5 | 6 | 2.93 | 93 |
| 11 | " | 51 | 2000 | 20 | 85 | 21.0 | 6 | 3.12 | 98 |
| 12 | 1% $Be_3N_2$ (0.5% Be) | 40 | 1950 | 20 | 85 | n.d. | n.d. | 2.52 | 79 |
| 13 | 5% $Mg_3N_2$ (3.5% Mg) | 33 | 1680 | 10 | 55 | $\approx 8$ | n.d. | n.d. | |
| 14 | " | 33 | 1750 | 11 | 55 | $\approx 11$ | n.d. | n.d. | |
| 15 | 2% $Mg_3N_2$ (1.5% Mg) | 47 | 1950 | 20 | 85 | 18 | 7 | 2.56 | 80 |
| 16 | 3% $Mg_2Si$ (2.5% Mg) | n.d. | 1750 | 15 | 85 | 12 | 1 | 1.8 | 56 |

Table I shows the effectiveness of the present combination of magnesium and beryllium additives. In Table I the sintered products of all of the runs were light grey in color.

Runs 5 to 11 illustrate the present invention. These runs show the substantial shrinkage or densification which takes place during sintering resulting in highly dense sintered products. X-ray diffraction analysis of the products of Run Nos. 5 to 11 show each product to be single phase. These products were hard and strong. The product of Run No. 7 showed a microhardness of 1600 KNOOP at a 500 gram load.

Specifically, the sintered products of Runs 7, 10 and 11 were sectioned, polished, etched and subjected to microscopic investigation. The product of Run No. 7 showed grains less than 2 microns with an average grain size less than 1 micron. The product of Run No. 10 was substantially the same as that of Run No. 7 except that the grains were slightly coarser but still less than 2 microns and they were substantially equiaxed and substantially uniform. These products appear to be comprised largely of β-form of silicon nitride with a minor amount of α present, i.e. they contained at least 80% by weight of β-form of silicon nitride.

The sintered product of Run No. 11 showed a significant number of elongated grains distributed in the matrix composed of substantially equiaxed, uniform grains. These needle-like, elongated grains were typically about 1-3 microns thick and ranged from about 5 microns to about 30 microns in length. Electron diffraction analysis of the elongated grains identified them as β-silicon nitride. The average grain size of the matrix was still less than 2 microns.

The sintered product of Run No. 9 was analyzed by emission spectroscopy and was found to contain 0.1% by weight magnesium and 0.3% by weight beryllium based on the amount of silicon nitride. This indicates that there is substantial loss of magnesium and a significant loss of beryllium in the present sintering process.

to the sintering conditions. This is illustrated by Run Nos. 8 to 12 which were prepared from the same batch of silicon nitride powder and which showed the same weight loss. This is further illustrated by Runs 6 and 7 which were also prepared from the same powder batch and which also showed about the same weight loss. Specifically, it is believed that the weight loss in Table I reflects the sum of five or six components: evaporation of paraffin used as binder (about 3%), loss of weight due to oxygen removal in the form of SiO (about 2%), loss of weight due to release of ammonia from the amorphous silicon nitride powder, weight loss due to thermal decomposition of $Si_3N_4$ during sintering, weight losses due to losses of beryllium and magnesium, and weight gain due to nitridation of free silicon present in the starting powder compact, i.e. the green body. As a result, weight loss due to thermal decomposition of silicon nitride must be less than 0.3% by weight of the total amount of silicon nitride present.

EXAMPLE 2

In this example a purchased powder was used which was indicated to be 95% by weight alpha and 5% by weight beta silicon nitride and having a surface area of 4.3 square meters per gram, which is equivalent to about 0.4 micron. This powder was indicated by the manufacturer to be 99.97% pure except for oxygen, that it contained molybdenum in an amount of about 0.01% by weight and also oxygen in an amount of 1.0% by weight of the powder.

For the runs tabulated in Table II all formulation, mixing and drying was carried out in nitrogen under dry-box conditions. For Runs 17 to 19 a portion of the silicon nitride powder was admixed with the given amount of magnesium nitride powder and a sufficient amount of a 1% solution of paraffin in benzene in a mortar and pestle to form a substantially uniform slurry. The slurry was strained and dried from the solvent. The resulting powder mixture, which was significantly homogeneous and had an average particle size that was submicron, was pressed into cylinders of substantially the same size and stored substantially as disclosed in Example 1.

In the remaining runs tabulated in Table II, the procedure was substantially the same as for Run No. 17 except that in Run Nos. 20 and 21 beryllium nitride powder was used, and in Run Nos. 22 to 24, the given combination of powder additives was used.

The bulk density of each green body was determined to be about 46%.

Sintering of each green body was carried out as set forth in Example 1 except as indicated in Table II.

TABLE II

| No. | Additive (Wt.%) | Sintering Conditions | | | Time (Min.) | Density | |
|---|---|---|---|---|---|---|---|
| | | Temperature °C | Pressure (Psi) | (Atmospheres) | | g/cc | % |
| 17 | 2% $Mg_3N_2$ (1.5% Mg) | 2000 | 1050 | 71 | 15 | 1.89 | 59 |
| 18 | " | 2000 | 1350 | 92 | 15 | 2.00 | 62.6 |
| 19 | " | 2040 | 1050 | 71 | 15 | 1.96 | 61.4 |
| 20 | 2% $Be_3N_2$ (1.0% Be) | 1990 | 1100 | 75 | 15 | 2.70 | 84.5 |
| 21 | " | 2050 | 1050 | 71 | 20 | 3.04 | 95.5 |
| 22 | 2% $Mg_3N_2$ (1.5% Mg) 1.0% $Be_3N_2$ (0.5% Be) | 1990 | 1050 | 71 | 15 | 2.39 | 75 |
| 23 | " | 2040 | 1100 | 75 | 15 | 2.37 | 74.5 |
| 24 | " | 2070 | 1100 | 75 | 15 | 2.55 | 79.0 |

In Run Nos. 17 to 19, where magnesium nitride alone was used, the low densities of the resulting sintered products indicate that magnesium nitride was not an effective sintering agent. Also, a comparison of Run Nos. 17 to 19 indicates that magnesium is responsive to pressure and that as a practical matter a sufficiently high nitrogen pressure could not be provided which would suppress magnesium evaporation of non-oxide magnesium additives.

Run Nos. 20 and 21 show that there was a substantial densification when beryllium nitride alone was used and that the beryllium additive is highly responsive to temperature.

Run Nos. 22 to 24, where a combination of the magnesium and beryllium nitride additives was used, illustrate that the combination of additives is temperature sensitive and show a significant upward trend in density in the resulting sintered products with increasing temperature. It is believed in Run Nos. 22 to 24 insufficient amount of beryllium additive was used at these particular sintering temperatures for this particular powder.

The sintered product of Run No. 23 was analyzed by emission spectroscopy and was found to contain 0.1% by weight magnesium and 0.2% by weight beryllium based on the amount of silicon nitride. This indicates that there is substantial loss of magnesium and a significant loss of beryllium in the present sintering process.

EXAMPLE 3

In this example a purchased silicon nitride powder indicated to be 80% by weight alpha and 20% beta silicon nitride was used.

The powder had a surface area of 2.6 square meters per gram which is equivalent to about 0.5 micron. This powder was indicated by the manufacturer to have been prepared by nitridation of silicon and that it contained impurities in weight % as follows: Ca<0.1%, Mg<0.1%, Fe<0.4%, Al 0.20%, and oxygen in an amount of about 1.5%. In addition, this powder was found to contain unreacted elemental silicon in an amount of about 7 weight %.

For the runs tabulated in Table III all formulation, mixing and drying was carried out substantially in the same manner as disclosed in Example 1 except that the mixture was milled with the silicon nitride grinding media for about 16 hours. The resulting homogeneous submicron powder mixture was pressed into green bodies, i.e. ⅜ inch × ⅜ inch cylinders, which were stored in a dessicator above calcium nitride. For Run Nos. 25 to 28 magnesium nitride alone was used, for Run Nos. 29 to 31 beryllium nitride alone was used and for Run Nos. 32 and 33 the given combination of the magnesium and beryllium nitride additives was used. The bulk density of each green body was determined to be about 61%.

Sintering of each green body was carried out as set forth in Example 1 except as indicated in Table III.

TABLE III

| Run No. | Additive (Wt.%) | Sintering Temperature | | | Time (Min.) | Density | |
|---|---|---|---|---|---|---|---|
| | | Temperature °C | Pressure (Psi) | (Atmospheres) | | g/cc | % |
| 25 | 2% $Mg_3N_2$ (1.5% Mg) | 1950 | 1050 | 71 | 15 | 2.50 | 78 |
| 26 | " | 2010 | 1100 | 75 | 15 | 2.59 | 81 |
| 27 | " | 2050 | 1050 | 71 | 15 | 2.62 | 82.1 |
| 28 | " | 1950 | 1400 | 95 | 15 | 2.65 | 83 |
| 29 | 2% $Be_3N_2$ (1.0% Be) | 1990 | 1050 | 71 | 10 | 2.3 | 72 |
| 30 | " | 2040 | 1050 | 71 | 15 | 2.61 | 81.8 |
| 31 | " | 2070 | 1050 | 71 | 15 | 2.70 | 84.5 |
| 32 | 2% $Mg_3N_2$ (1.5% Mg) 1% $Be_3N_2$ (0.5% Be) | 1990 | 1100 | 75 | 15 | 2.96 | 92.7 |
| 33 | " | 2040 | 1050 | 71 | 15 | 2.98 | 93.4 |

Run Nos. 32 and 33 illustrate the present invention and show that the present combination of magnesium and beryllium nitride additives produced sintered products with densities substantially higher than those produced with the magnesium or beryllium additives alone at comparable sintering temperature and pressures.

EXAMPLE 4

This example illustrates one technique of determining weight loss due to thermal decomposition of silicon nitride.

A reaction bonded silicon nitride cylinder, about ½ inch in length and about ¼ inch in diameter, prepared by the nitridation of a highly pure silicon sintered body was used. The cylinder had a density of about 70% of the theoretical density of silicon nitride and was porous with interconnecting pores.

The cylinder was weighed and subjected to conditions which were substantially the same as the sintering conditions set forth in Example 1 except that it was maintained at a temperature of 1800° C. under a pressure of nitrogen of 80 atmospheres for a period of 1 hour. It was weighed again and then re-heated to a temperature of 2000° C. and kept at 2000° C. under a pressure of 80 atmospheres for 1 hour. It was then weighed again.

The total weight loss was found to be less than 0.5% by weight of the product indicating that silicon nitride did not undergo significant thermal decomposition under these conditions.

All of the following cited applications are, by reference, made part of the disclosure of the present application and are assigned to the assignee hereof:

In copending U.S. patent application Ser. No. 756,085 entitled "Sintering Of Silicon Nitride Using Be Additive", filed of even date herewith in the names of Svante Prochazka, Charles D. Greskovich, Richard J. Charles and Robert A. Giddings, the disclosed process comprises forming a particulate dispersion of silicon nitride and beryllium additive into a green body and sintering the green body at a temperature ranging from about 1900° C. to about 2200° C. in a sintering atmosphere of nitrogen at superatmospheric pressure producing a sintered body with a density ranging from about 80 to about 100%.

In copending U.S. patent application Ser. No. 756,084 entitled "Hot Pressed Silicon Nitride Using Beryllium Additive", filed of even date herewith in the names of Charles D. Greskovich, Svante Prochazka and Chester R. O'Clair, there is disclosed a dense polycrystalline silicon nitride body produced by hot pressing a particulate mixture of silicon nitride and beryllium additive.

In copending U.S. patent application Ser. No. 756,083 entitled "Hot Pressing Of Silicon Nitride Using Magnesium Silicide", filed of even date herewith in the names of Charles D. Greskovich and Chester R. O'Clair, there is disclosed a dense polycrystalline silicon nitride body produced by hot pressing a particulate mixture of silicon nitride and a magnesium additive.

What is claimed is:

1. A method of producing a pre-shaped polycrystalline body which consists essentially of providing at least a significantly homogeneous dispersion having an average particle size which is submicron of silicon nitride, a magnesium additive and a beryllium additive, said magnesium additive being selected from the group consisting of magnesium, magnesium carbide, magnesium nitride, magnesium cyanide, magnesium fluoride, magnesium silicide, magnesium silicon nitride and mixtures thereof, said magnesium additive being used in an amount wherein the magnesium component is equivalent to from about 0.5% by weight to about 4% by weight of elemental magnesium based on the amount of silicon nitride, said beryllium additive being selected from the group consisting of beryllium, beryllium carbide, beryllium fluoride, beryllium nitride, beryllium silicon nitride and mixtures thereof, said beryllium additive being used in an amount wherein the beryllium component is equivalent to from about 0.1% by weight to about 2% by weight of elemental beryllium based on the amount of silicon nitride, shaping said dispersion into a green body and sintering said green body at a temperature ranging from about 1800° C. to about 2200° C. in a sintering atmosphere of nitrogen, said nitrogen being at a superatmospheric pressure which at said sintering temperature prevents significant thermal decomposition of said silicon nitride and produces a sintered body with a density of at least about 80% of the theoretical density of silicon nitride, the minimum pressure of said nitrogen ranging from about 10 atmospheres at a sintering temperature of 1800° C. to a minimum pressure of about 130 atmospheres at a sintering temperature of 2200° C.

2. A method according to claim 1 wherein said sintering temperature is about 1900° C. and said minimum pressure of nitrogen is about 20 atmospheres.

3. A method according to claim 1 wherein said sintering temperature is about 2000° C. and said minimum pressure of nitrogen is about 40 atmospheres.

4. A method according to claim 1 wherein said sintering temperature is about 2100° C. and said minimum pressure of nitrogen is about 75 atmospheres.

5. A method according to claim 1 wherein said beryllium additive is beryllium nitride.

6. A method according to claim 1 wherein said beryllium additive is used in an amount wherein the beryllium component is equivalent to from about 0.25% by weight to about 1% by weight of elemental beryllium based on the amount of silicon nitride.

7. A method according to claim 1 wherein said magnesium additive is magnesium nitride.

8. A method according to claim 1 wherein said magnesium additive is used in an amount wherein the magnesium component is equivalent to from about 1.0% by weight to about 2.0% by weight of elemental magnesium based on the amount of silicon nitride.

* * * * *